US006557065B1

(12) United States Patent
Peleg et al.

(10) Patent No.: US 6,557,065 B1
(45) Date of Patent: Apr. 29, 2003

(54) CPU EXPANDABILITY BUS

(75) Inventors: Alex D. Peleg, Cupertino, CA (US); Adi Golbert, Haifa (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/466,890

(22) Filed: Dec. 20, 1999

(51) Int. Cl.$^7$ .............................................. G06F 13/00
(52) U.S. Cl. ...................................... 710/300; 710/312
(58) Field of Search .............................. 710/100, 300, 710/305, 306, 307, 308, 312, 313, 315

(56) References Cited

U.S. PATENT DOCUMENTS

| | | | |
|---|---|---|---|
| 5,355,391 A | 10/1994 | Horowitz et al. | 375/36 |
| 5,634,043 A | * 5/1997 | Self et al. | 713/503 |
| 5,841,580 A | 11/1998 | Farmwald et al. | 365/194 |
| 5,991,824 A | * 11/1999 | Strand et al. | 709/238 |
| 6,151,651 A | * 11/2000 | Hewitt et al. | 710/315 |
| 6,161,189 A | * 12/2000 | Arimilli et al. | 713/400 |
| 6,219,754 B1 | * 4/2001 | Belt et al. | 710/313 |
| 6,252,612 B1 | * 6/2001 | Jeddeloh | 345/531 |
| 6,266,719 B1 | * 7/2001 | Rasmussen et al. | 710/53 |
| 6,421,751 B1 | * 7/2002 | Gulick | 710/107 |

OTHER PUBLICATIONS

"Applications for Rambus® Interface Technology," Feb. 1998, pp. 1–6.
"Direct Rambus™ Memory for Desktop PC Systems," pp. 1–4.
Direct Rambus™ Memory for Large Memory Systems, May 1998, pp. 1–5.
"Direct Rambus™ Memory for PC Graphics," May 1998, pp. 1–4.
"Direct Rambus™ System and Board Design Considerations," May 1998, pp. 1–3.
"Rambus Memory: Multi–Gigabytes/Second and Minimum System Cost," pp. 1–4.
"The Rambus Solution: The Rambus Channel, the RDRAM® and the Memory Controller," *Rambus®* Technology Overview, Feb. 12, 1999, pp. 1–11.

* cited by examiner

*Primary Examiner*—Xuan Thai
(74) *Attorney, Agent, or Firm*—Kenyon & Kenyon

(57) ABSTRACT

Embodiments of the present invention provide a computer system with a high speed, high bandwidth expandability bus for integrated and non-integrated CPU products. The computer system includes a processor, a chipset coupled to the processor, a graphics processor coupled to the chipset for controlling a video display and a main memory coupled to the chipset. The computer system further includes an expandability bus, which is coupled at one end to the chipset and at the other end to a replaceable electronic component. The expandability bus can be changeably configured to enable or disable bus mastering at both ends, as required, to operate with whichever replaceable electronic component is installed.

27 Claims, 5 Drawing Sheets

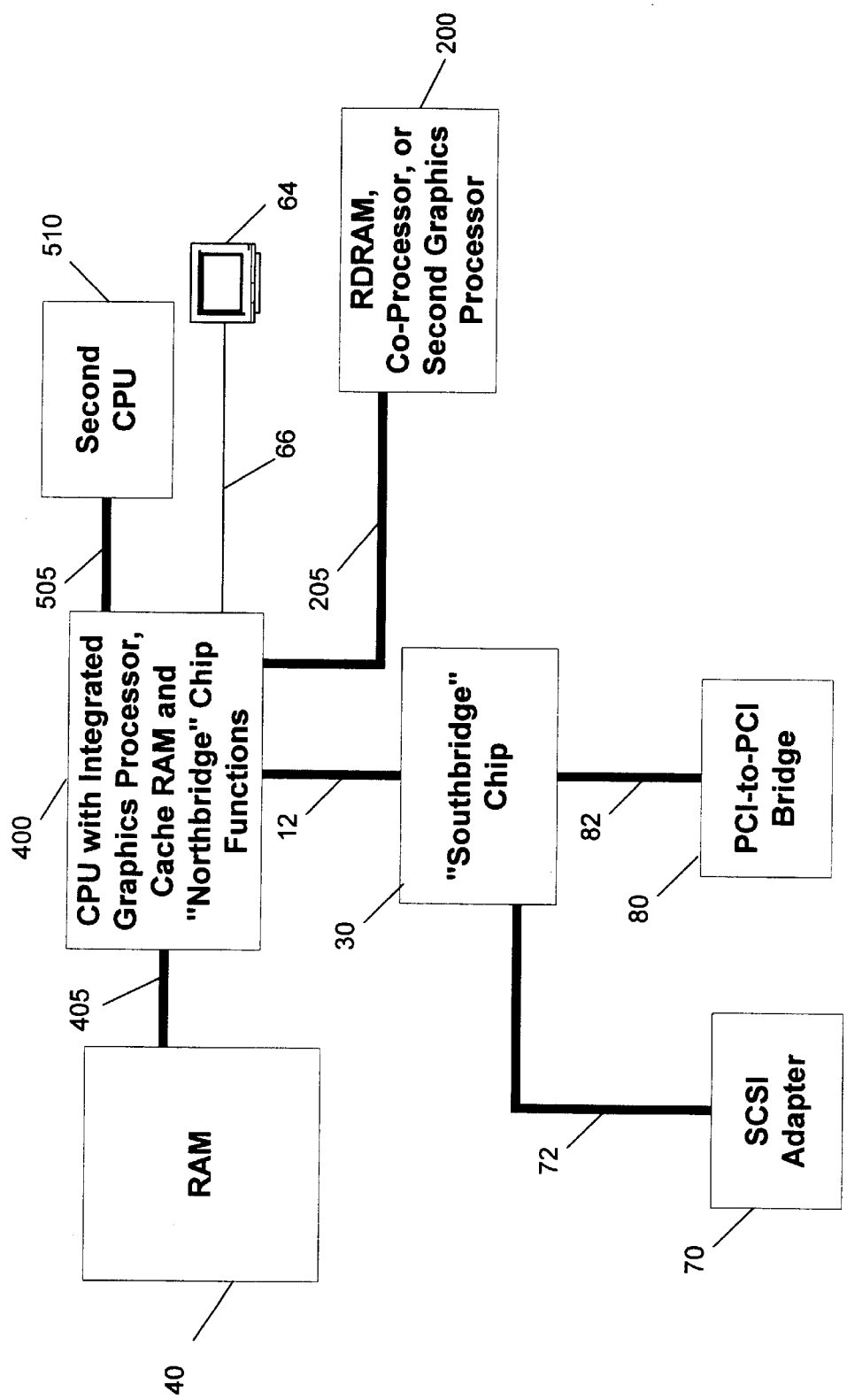

CPU EXPANDABILITY BUS

FIELD OF THE INVENTION

The present invention relates to a high speed and high bandwidth expandability bus that is compatible with various integrated and non-integrated central processing unit products.

BACKGROUND OF THE INVENTION

The current, "standard" state-of-the-art personal computer ("PC") architecture has evolved, and continues to evolve, in response to the marketplaces demand for faster processing speeds and the quickest possible application response times. This is especially true for graphics and video intensive applications, such as, high-resolution graphic video games and streaming video programs. In addition, future processor designs that are currently being developed (for example, processors having integrated graphics co-processors), will operate at speeds far above existing bus transmission speeds. As a result, the demand for ever faster systems continues to grow. As in the past, a major limiting factor on how fast PCs can process and display information depends on how quickly the necessary information can be provided to and received from the central processor unit ("CPU"). The two major components that determine this response time are the speed of the random access memory ("RAM") and the speed at which the bus can transmit the information in RAM to and from the CPU.

FIG. 1 is a generic block diagram of a hypothetical general PC architecture. In FIG. 1, a CPU 10 is coupled to a controller chip known as a "Northbridge" chip 20 by a front-side bus ("FSB") 12 and the CPU 10 is also coupled to a level 2 cache RAM 50 by a back-side bus ("BSB") 14. Integrated in the CPU 10 is a level 1 cache RAM (not shown) that can transfer data at clock speeds equivalent to the CPU 10. The "Northbridge" chip 20 is a Very Large Scale Integration ("VLSI") chip 20 that provides the main system logic chip portion of the PC motherboard chipset 16. The "chipset" 16 couples and controls all of the different parts of the PC motherboard and usually comprises the Northbridge chip 20 and a Southbridge chip 30. The Northbridge chip 20 couples the FSB 12 from the CPU 10 to an Accelerated Graphics Port ("AGP") bus 62 via an AGP (not shown), Intel AGP Interface Specification Revision 2.0, published May 4, 1998; a main memory bus 42; a Peripheral Component Interconnect ("PCI") bus 82, PCI Special Interest Group (SIG) PCI Specification, Revision 20, published May 8, 1996; and a Small Computer Systems Interface ("SCSI") bus 72, ANSI X3.131-1994, Small Computer System Interface—2 (SCSI-2), published 1994. The graphics processor 60 is also coupled to a video monitor 64 by cable 66 and the graphics processor 60 is designed to provide rapid updates of the information that is displayed on video monitor 64. The AGP bus 62 is also coupled to an AGP graphics processor 60. The graphics processor 60 can, also, coupled to a video frame buffer RAM (not shown) by a video bus (not shown) for increased display speed. Finally, the Southbridge chip 30 is coupled to the PCI bus 82 by a stub 83 for communicating with the Northbridge chip 20 and a PCI-to-PCI bridge 80.

The "Southbridge" chip 30, which is also a VLSI chip, provides connections to current and old peripheral and communication devices and cards (not shown) including, but not limited to, for example, printers, modems, keyboards, mouses, CD-ROM drives, hard disk drives, floppy disk drives and Industry Standard Architecture ("ISA") cards. Additionally, the Southbridge chip 30 provides the interfaces for Universal Serial Bus ("USB") connectors (not shown), USB Specification, Version 1.1, published Sep. 23, 1998 and IEEE 1394 (also referred to as "Firewire") connectors (not shown), IEEE Standard 1394-1995, Standard for a High Performance Serial Bus, published 1995.

FIG. 2 is a generic block diagram of a hypothetical state-of-the-art PC architecture that is very similar to the architecture in FIG. 1. In FIG. 2, the only differences from FIG. 1 occur in the chipset and, specifically, on how the Northbridge chip 20 and the Southbridge chip 30 are coupled to each other and on how the chipset 16 is coupled to the PCI bus 82. In FIG. 2, the Northbridge chip 20 is now directly coupled to the Southbridge chip 30 by a proprietary bus 84 and the Southbridge chip 30 is directly coupled to the PCI bus 82 for communication over the PCI-to-PCI bridge 80.

Unfortunately, current bus speeds are not keeping pace with the advances in processor speed and, as a result, the buses are becoming a major limiting factor in overall computer system speed and performance.

Since future system and processor designs (for example, multi-processor systems and processors having integrated graphics co-processors) will operate at speeds far above existing bus transmission speeds, the demand for ever faster bus systems will continue to grow. Therefore, it can be appreciated that a substantial need exists for a new fast, high bandwidth bus that is protocol independent and can couple multiple agents.

SUMMARY OF THE INVENTION

Embodiments of the present invention provide a computer system with a high speed, high bandwidth expandability bus for integrated and non-integrated CPU products. The computer system includes a processor, a chipset coupled to the processor and an expandability bus, which is coupled at one end to the chipset and at the other end to a replaceable electronic component. The expandability bus can be changeably configured to enable or disable bus mastering at both ends, as required, to operate with whichever replaceable electronic component is installed.

BRIEF DESCRIPTION OF THE DRAWINGS

FIG. 5 is a block diagram of another embodiment of the expandability bus implementation in FIG. 4.

DETAILED DESCRIPTION

Figure 1:
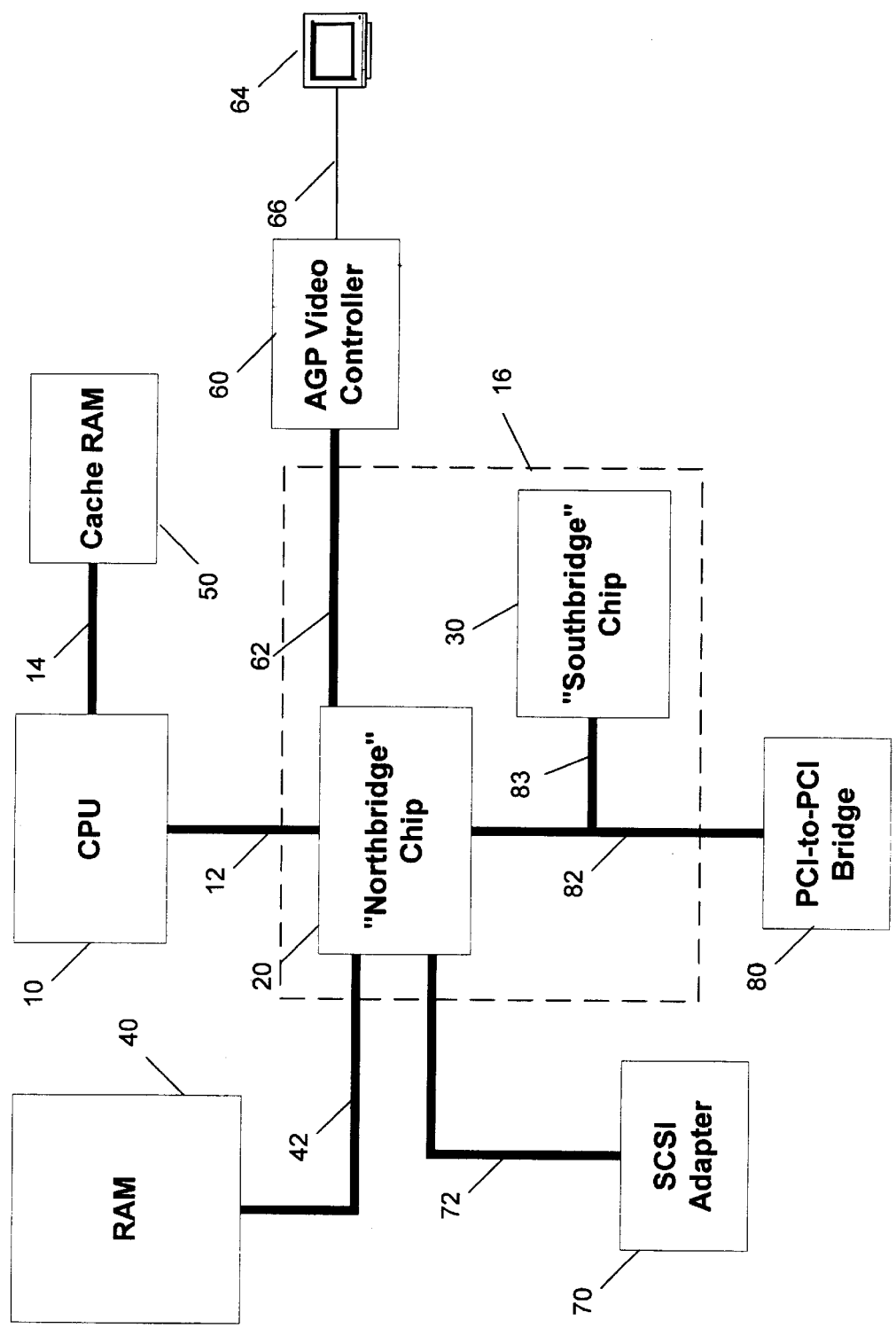
FIG. 1 is a generic block diagram of a hypothetical general personal computer (PC) architecture.

In accordance with an embodiment of the present invention, the expandability bus is a point-to-point bus built around the Rambus® Dynamic Random Access Memory ("RDRAM"®) interface concept of a fast thin-bus to enable directly coupling two agents, for example, a CPU to a RAM; directly chaining processors; replacing the AGP bus; and coupling either a RDRAM® memory, a co-processor (for example, a digital signal processor ("DSP")) or an external graphics processor. Rambus® technology is licensed by Rambus, Inc. of Mountain View, Calif. A "point-to-point" bus is a bus that runs directly between only two components. A "thin bus" is a bus with a reduced pin count, in comparison to standard bus designs, which is usually achieved by overloading some of the remaining pins. However, unlike conventional single end RDRAM® bus mastering, the expandability bus can be configured to support bus mastering from either or both ends of the bus. "Bus mastering" is the controlling of a bus by a device coupled to the bus to enable the device to directly communicate with other devices on the bus without the communication passing through the CPU. Whether, and to what extent, bus mastering is supported on a bus depends on whether the specific bus protocol that is implemented on the bus supports bus mastering at all and if it supports only a single bus master or multiple bus masters. The device that is controlling the bus is variously referred to as a bus master or a controller. Examples of devices that can be used as the bus master or controller include, but are not limited to: CPUs, AGP and other graphic controllers, Direct Memory Access ("DMA") devices, Floating Point Units (FPUs) and other co-processors. In addition, the expandability bus can be configured to act as a regular RDRAM® channel for increased bandwidth performance.

In accordance with an embodiment of the present invention, advantages of the expandability bus over the AGP bus include a higher transmission bandwidth, an increased transmission speed, reduced pin count (approximately 90 pins or less versus 124 pins for AGP), the ability to support bus mastering either from a fixed end or both ends of the bus. For example, in one embodiment of the present invention the bandwidth for the expandability bus is 1.6 GB/sec for a 400 MHz expandability bus, which is significantly faster than the AGP and comparable to RDRAM®. Additional embodiments of the present invention are contemplated for 533 MHz and faster busses on the same approximately 90 pins or less.

In accordance with an embodiment of the present invention, the expandability bus is designed to work with both the older, non-integrated CPU and other chip designs and the new generation of integrated CPU and other chip designs. Regardless, a new interface to support the expandability bus must be added to both the integrated and non-integrated designs to enable the expandability bus to work with either design. For example, in a non-integrated system in which an Intel® 82440 is used as the Northbridge chip interface to a CPU, the Northbridge chip would have to be modified to accept the expandability bus. The Intel® 82440 is a product of Intel Corporation of Santa Clara, Calif. Similar modifications would have to be made to the integrated CPU and other chip designs.

It is contemplated that the expandability bus can have multiple embodiments. These embodiments depend on whether the expandability bus is coupled from the CPU or the Northbridge chip and include: behaving as an RDRAM® channel coupled to RDRAM® memory (in chips with an existing RDRAM® connection, the bus can be used as a second RDRAM® channel); directly coupling the CPU with a second CPU; directly coupling the CPU and RAM; and completely replacing the AGP bus. It should be noted that the above are merely exemplary of the total number of possible embodiments of the expandability bus and in no way should these examples be construed as the only possible embodiments of the present invention.

In accordance with embodiments of the present invention, the benefits of the expandability bus include: providing a standard single set of interfaces from the CPU and Northbridge chip; and enabling upgrades of integrated graphics, and other, chips by enabling the addition of a new graphics chip without replacing the integrated graphics processor chip. This is especially desirable for integrated graphics processor chips that are perceived to be obsolete, since the integrated graphics processor chip can either be disabled or used in combination with the new graphics chip.

Figure 2:
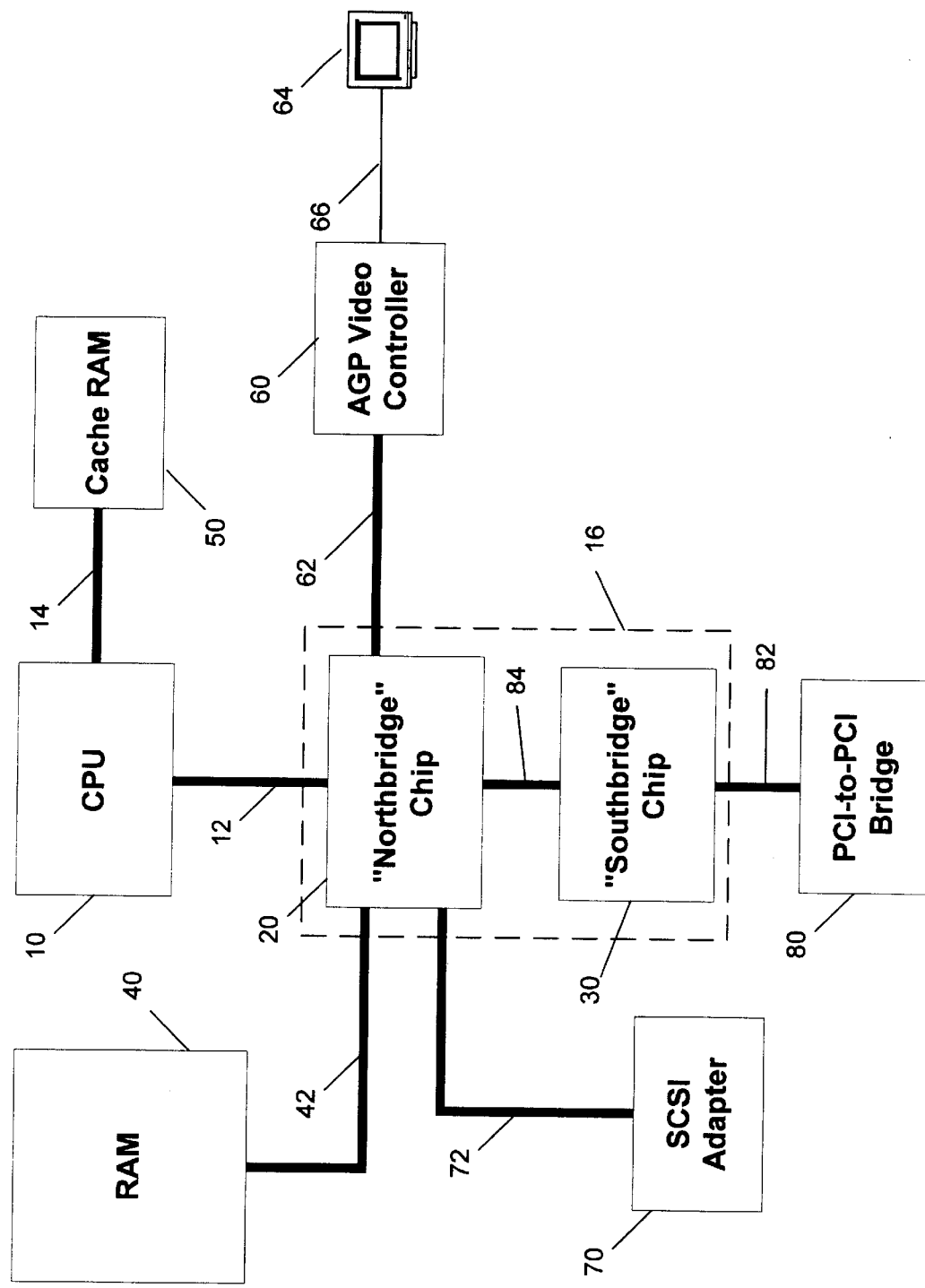
FIG. 2 is a generic block diagram of a hypothetical state-of-the-art general personal computer (PC) architecture.
Figure 3:
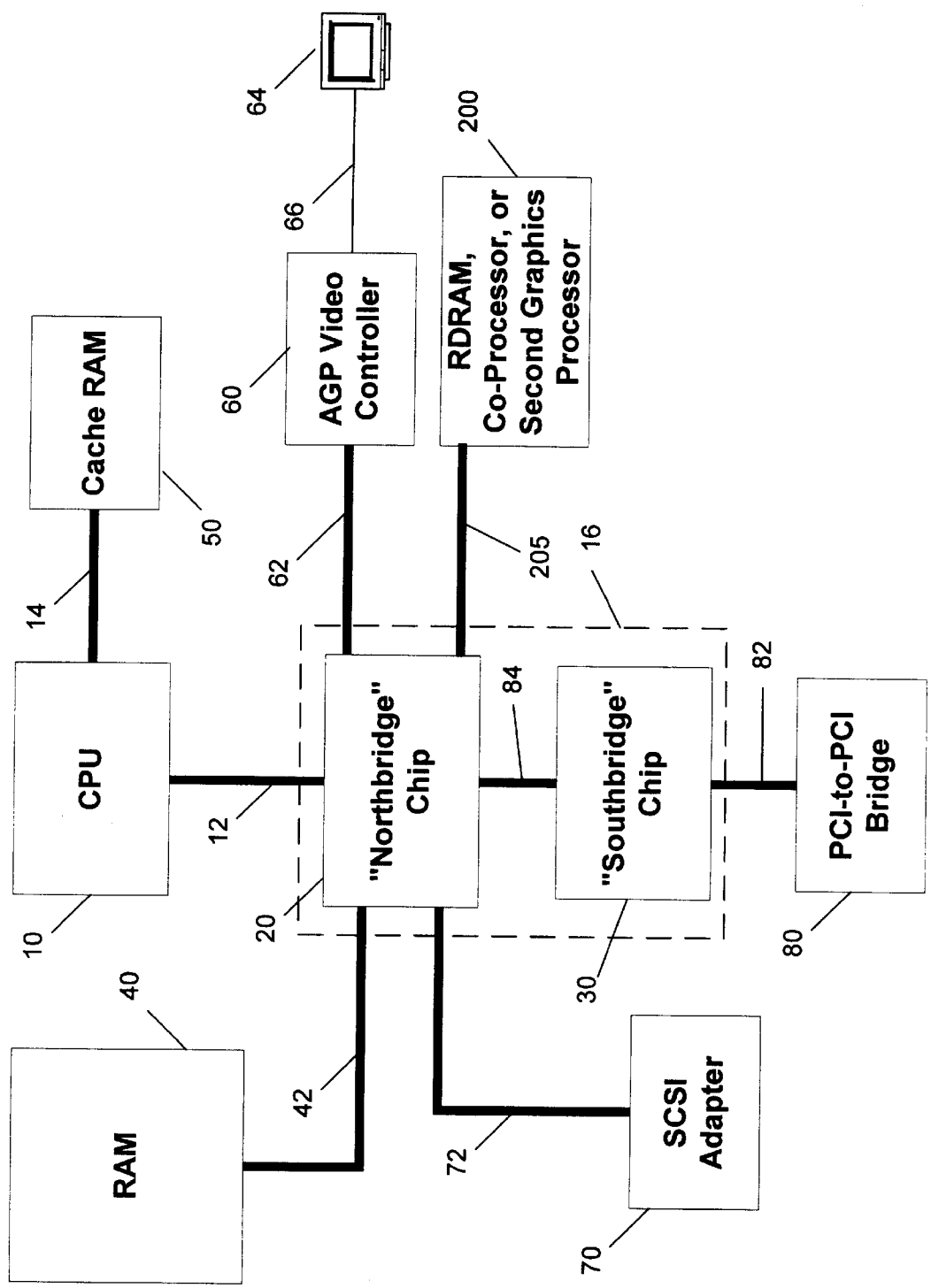
FIG. 3 is a block diagram of an embodiment of the expandability bus implemented in the PC architecture of FIG. 2.

FIG. 3 illustrates a block diagram of an embodiment of the expandability bus implementation in the PC architecture of FIG. 2. In the embodiment shown in FIG. 3, all of the same elements as described above for FIG. 2 are present and the numbering used in FIG. 2 is carried over in this and all subsequent figures. In FIG. 3, an expandability bus 205 has been added to couple the Northbridge chip 20 to an RDRAM®, co-processor or second graphics processor component 200.

While only a single expandability bus 205 and RDRAM®, co-processor or second graphics processor component 200 is shown in FIG. 3 for ease of illustration, alternative embodiments are contemplated in which any number and combination of expandability busses 205 RDRAM®, co-processor or second graphics processor components, video controllers, adapters, bridges and other controller or interface chips can be coupled to the Northbridge chip 20. This number is of course limited by the size and layout of the Northbridge chip 20 used in the computer system. For example, the AGP bus 62 and the main memory bus 42 can each be replaced by separate expandability busses. Similar, although not all, embodiments are contemplated for coupling expandability busses to the CPU 10.

In the embodiment of the expandability bus 205 of FIG. 3, the configuration of the expandability bus 205 is preset by the computer system manufacturer based on whichever component is initially installed and coupled to the expandability bus 205. Exemplary embodiments include: configuring the expandability bus 205 to have a single bus master at the chipset end for use with RDRAM® or DRAM; and configuring the expandability bus 205 to have dual bus masters at both the chipset and electronic component ends for use with co-processors or the second graphics processor. In FIG. 3, the RDRAM®, co-processor and second graphics processor component 200 can be replaced with a different chip in order to perform different functions. However, once a different chip is installed, the expandability bus 205 must be reconfigured using a setup procedure specific to the computer system to specify that the different chip is installed and, then, the computer system restarted. The setup procedure can be provided in the computer system basic input and output system ("BIOS") and accessed during system startup by pressing a specified key or keys, for example, the "delete" key, when prompted during startup or a utility program accessed from the operating system after system startup. Regardless of which method is used to change the configuration, the system must be restarted before the new configuration will be recognized and used by the computer system.

Other contemplated embodiments include integrating a graphics processor on the CPU 10 or the Northbridge chip 20 and integrating the cache RAM 50 memory on the CPU 10. For example, in an embodiment (not shown) cache RAM 50 is integrated into the CPU 10 and an expandability bus is coupled at one end to the CPU 10 and at the other end to a second CPU. This embodiment is made possible by versions of the Northbridge chip 20 that work with dual CPUs, such as, an Intel® 82840 chipset, which is a product of Intel Corporation of Santa Clara, Calif. However, unlike for the replaceable RDRAM®, co-processor and second graphics processor component 200 embodiments, in the dual CPU embodiments, the expandability bus configuration set by the computer system manufacturer that couples the two CPUs can not be reconfigured using any of the setup procedures described above. In order to reconfigure the expandability bus to work with a new second CPU, the motherboard must be re-manufactured so that the configuration of the expandability bus is set to work with the new second CPU. In general, "re-manufacturing" to permit this kind of reconfiguration involves physically changing the pin definitions in whichever chip is acting as the interface between the expandability bus and the CPUs or other chips. In this embodiment, since the 82840 chipset is acting as the interface between the two CPUs, the pin definitions in the 82840 chipset would have to be changed to permit the interface of the new second CPU.

Similarly, in another embodiment of the expandability bus (not shown), the AGP bus 62 and the AGP video controller 60 are deleted and the monitor 64 is directly coupled to a Northbridge chip with an integrated graphics processor. Alternatively, in another embodiment (not shown), the CPU 10 could be replaced by a CPU with an integrated graphics processor which controls the video display via the Northbridge chip 20. In another contemplated embodiment (also not shown), the monitor is directly coupled to the CPU with the integrated graphics processor to provide increase display speeds. Still other embodiments are well known to those of skill in the art.

Figure 4:
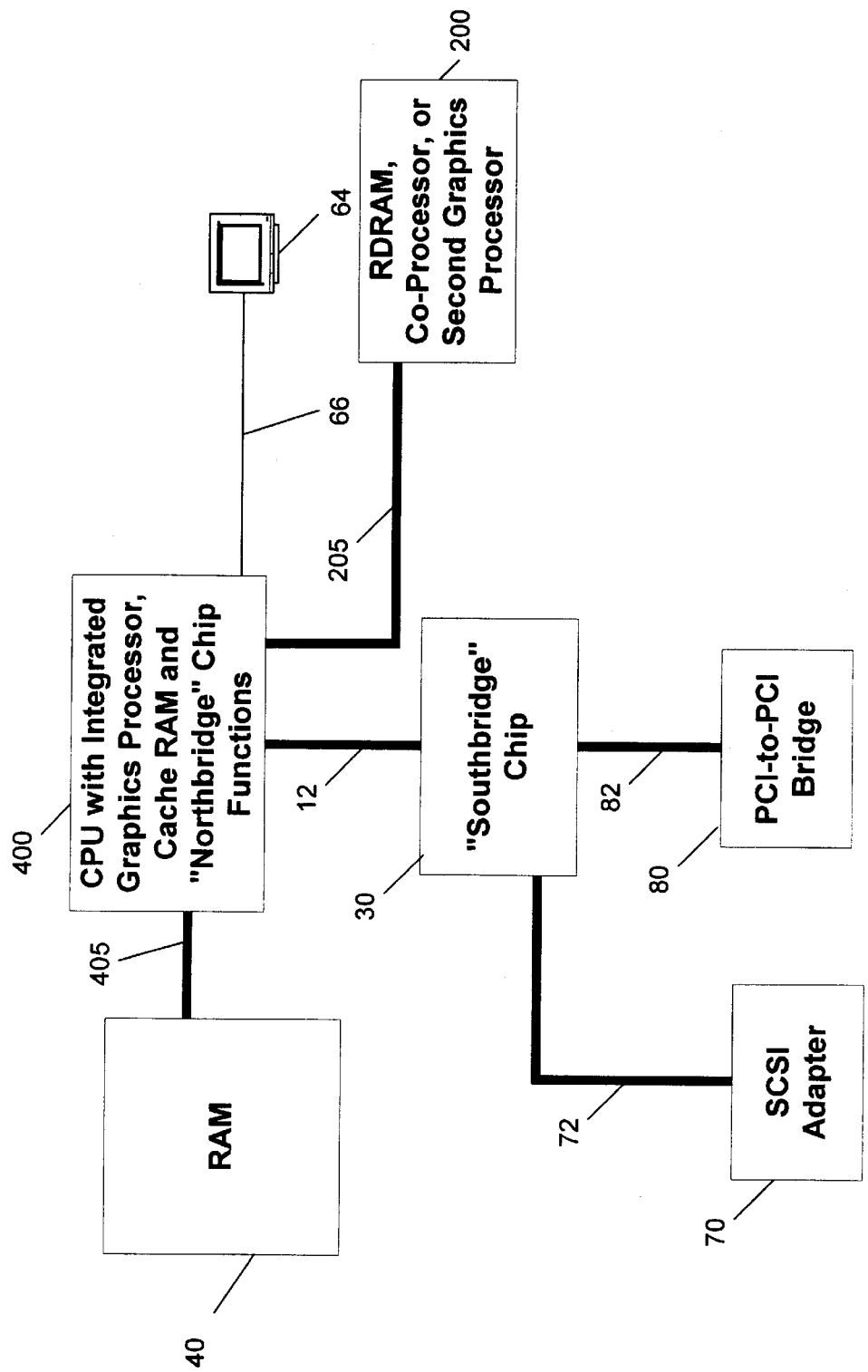
FIG. 4 is a block diagram of another embodiment of the expandability bus implementation in a highly integrated CPU architecture.

FIG. 4 illustrates a block diagram of another embodiment of the expandability bus implementation in a highly integrated CPU architecture. In FIG. 4, the CPU 10, BSB 14 and level 2 cache RAM 50 of FIG. 3 have been replaced, in FIG. 4, by an integrated CPU with a graphics processor, cache RAM and Northbridge chip 400. The expandability bus 205 is now directly coupled to the integrated CPU 400 to couple the RDRAM®, co-processor or second graphics processor component 200 to the integrated CPU 400. A second expandability bus 405 has been added to directly couple the integrated CPU 400 to main memory RAM 40. This structure provides for direct CPU access to main memory at expandability bus data rates. In addition, since the functions of the Northbridge chip 20 of FIG. 3 have been integrated into integrated CPU 400, the Southbridge chip 30 is now directly coupled by the FSB 12 to the integrated CPU 400. Additionally, SCSI adapter 70 is now coupled to the Southbridge chip 30 by SCSI bus 72. The AGP bus 62 and the AGP video controller 60 of FIG. 3 have been deleted and, in FIG. 4, the monitor 64 is now directly coupled to the integrated CPU 400.

FIG. 5 illustrates a block diagram of another embodiment of the expandability bus implementation in FIG. 4. In FIG. 5, a third expandability bus 505 couples the integrated CPU 400 with a second CPU 510. Just as described with the dual CPU embodiments of FIG. 3, in this embodiment, the configuration of the expandability bus 505 coupling the dual CPUs 400 and 510 can not be changed using any of the setup procedures.

Embodiments of the present invention advantageously allow:

A higher transmission bandwidth than the AGP. This will become necessary to process multiple texture maps which are used in three dimensional graphics applications.

A lower pin count than the AGP bus.

Bus mastering from both ends of the bus.

The ability to act as an RDRAM® channel if only bandwidth is needed.

Adding an external graphics chip to overcome having a perceived obsolete integrated graphics processor.

Standardization of the interfaces from the CPU as being either regular RDRAM® or expandability.

Scalability to 533 MHz and above on the same pin count.

In the foregoing detailed description, apparatus and methods in accordance with embodiments of the present invention have been described with reference to specific representative embodiments. Accordingly, the present specification and figures are to be regarded as illustrative rather than restrictive. As such, it will be appreciated that modifications and variations of the present invention are covered by the above teachings and within the scope and purview of the appended claims without departing from the spirit and intended scope of the invention.

What is claimed is:

1. A computer system with a high speed, high bandwidth expandability bus comprising:
    a processor;
    a chipset coupled to said processor;
    an expandability bus coupled at a first end to said chipset; and
    an electronic component coupled to a second end of said expandability bus, said expandability bus being configurable to enable bus mastering at said first and second ends and said expandability bus being configured to operate with said electronic component;
    said electronic component being replaceable and said expandability bus being changeably configurable to operate with a replacement electronic component.

2. The computer system of claim 1, wherein said electronic component is selected from the group comprising:
    a co-processor;
    a dynamic random access memory (DRAM);
    a rambus DRAM (RDRAM); and
    a graphics processor.

3. The computer system of claim 1, wherein said electronic component is replaced by said replacement electronic component and said expandability bus is reconfigured to operate with said replacement electronic component.

4. The computer system of claim 3, wherein the reconfiguration of said expandability bus is performed using a setup procedure specific to said computer system.

5. The computer system of claim 1, wherein said chipset comprises:
    a northbridge chip coupled to said processor, wherein said northbridge chip includes the main system logic functions of said computer system; and
    a southbridge chip coupled to said northbridge chip.

6. The computer system of claim 5, wherein said northbridge chip is coupled to said southbridge chip by a proprietary bus.

7. The computer system of claim 5, wherein said northbridge chip is further coupled to a graphics processor, said electronic component, and a main memory.

8. The computer system of claim 7, wherein said northbridge chip is coupled to said graphics processor using either an advanced graphics port bus or a second expandability bus.

9. The computer system of claim 7, wherein said northbridge chip is coupled to said main memory using either a main memory bus or a second expandability bus.

10. A computer system with a high speed, high bandwidth expandability bus comprising:

a processor means;

a chipset means coupled to said processor means;

an expandability bus means coupled at a first end to said chipset means; and an electronic component means coupled to a second end of said expandability bus means, said expandability bus means being configurable to enable bus mastering at said first and second ends and said expandability bus means being configured to operate with said electronic component means;

said electronic component means being replaceable and said expandability bus means being changeably configurable to operate with a replacement electronic component means.

11. The computer system of claim 10, wherein said electronic component means is selected from the group comprising:

a co-processor means;

a dynamic random access memory (DRAM) means;

a rambus DRAM (RDRAM) means; and a graphics processor means.

12. The computer system of claim 10, wherein said electronic component means is replaced by said replacement electronic component means and said expandability bus means is reconfigured to operate with said replacement electronic component means.

13. The computer system of claim 10, wherein the reconfiguration of said expandability bus means is performed using a setup procedure means specific to said computer system.

14. The computer system of claim 10, wherein said chipset comprises:

a northbridge chip means coupled to said processor means, wherein said northbridge chip means includes the main system logic functions of said computer system; and a southbridge chip means coupled to said northbridge chip means.

15. The computer system of claim 14, wherein said northbridge chip means is coupled to said southbridge chip means by a proprietary bus means.

16. The computer system of claim 14, wherein said northbridge chip means is further coupled to a graphics processor means, said electronic component means, and a main memory means.

17. The computer system of claim 16, wherein said northbridge chip means is coupled to said graphics processor means using either an advanced graphics port bus means or a second expandability bus means.

18. The computer system of claim 16, wherein said northbridge chip means is coupled to said main memory means using either an advanced graphics port bus means or a second expandability bus means.

19. An integrated processor computer system with a high speed, high bandwidth expandability bus comprising:

an integrated processor;

a chipset coupled to said processor;

a first expandability bus coupled at a first end to said integrated processor;

an electronic component coupled at a second end to said expandability bus, said expandability bus being configurable to enable bus mastering at said first and second ends and said expandability bus being configured to operate with said electronic component, said electronic component being replaceable and said expandability bus being changeably configurable to operate with a replacement electronic component; and a main memory coupled to said integrated processor using a second expandability bus.

20. The computer system of claim 19, wherein said integrated processor comprises:

a central processing unit (CPU);

a northbridge chip;

a cache random access memory (RAM); and a graphics processor.

21. The computer system of claim 19, wherein said electronic component is selected from the group comprising:

a co-processor;

a dynamic random access memory (DRAM);

a rambus DRAM (RDRAM); and a graphics processor.

22. The computer system of claim 19, wherein said electronic component is replaced by said replacement electronic component and said expandability bus is reconfigured to operate with said replacement electronic component.

23. The computer system of claim 22, wherein the reconfiguration of said expandability bus is performed using a setup procedure specific to said computer system.

24. The computer system of claim 19, wherein said chipset comprises:

a southbridge chip coupled to said integrated processor.

25. The computer system of claim 20, further comprising a second CPU coupled to said integrated processor using a third expandability bus.

26. The computer system of claim 25, wherein said third expandability bus is permanently configured to operate with said second CPU.

27. A multi-processor computing system with a high-speed, high-bandwidth expandability bus comprising:

a first processor;

a second processor coupled to said first processor;

a chipset coupled to at least one of said first and second processors;

a graphics processor coupled to one of said first processor, said second processor and said chipset for controlling a video display;

a main memory coupled to one of said first processor, said second processor and said chipset; and an expandability bus coupled at a first end to one of said first processor, said second processor and said chipset; and an electronic component coupled to a second end of said expandability bus, said expandability bus being configurable to enable bus mastering at said first and second ends and said expandability bus being configured to operate with said electronic component;

said electronic component being replaceable and said expandability bus being changeably configurable to operate with a replacement electronic component.

* * * * *